US011894636B2

(12) United States Patent
Lv et al.

(10) Patent No.: US 11,894,636 B2
(45) Date of Patent: Feb. 6, 2024

(54) ELECTRICAL CONNECTOR WITH STRUCTURE TO SECURE A SHIELD TO AN INSULATING BODY

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Lai-Hang Lv, Kunshan (CN); De-Jin Chen, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 81 days.

(21) Appl. No.: 17/574,741

(22) Filed: Jan. 13, 2022

(65) Prior Publication Data

US 2022/0224058 A1 Jul. 14, 2022

(30) Foreign Application Priority Data

Jan. 13, 2021 (CN) ........................ 202120082826.2
Jan. 13, 2021 (CN) ........................ 202120084204.3

(51) Int. Cl.
*H01R 13/6581* (2011.01)
*H01R 13/658* (2011.01)
(Continued)

(52) U.S. Cl.
CPC ....... *H01R 13/6581* (2013.01); *H01R 12/724* (2013.01); *H01R 12/727* (2013.01);
(Continued)

(58) Field of Classification Search
CPC ........................ H01R 13/6581; H01R 12/724; H01R 12/727; H01R 13/506; H01R 13/648; H01R 13/658; H01R 13/6594; H01R 24/60
See application file for complete search history.

(56) References Cited

U.S. PATENT DOCUMENTS 10,601,181 B2 3/2020 Lu et al.
11,588,277 B2 * 2/2023 Jiang .................. H01R 12/727
(Continued)

FOREIGN PATENT DOCUMENTS

CN 200969448 Y 10/2007
CN 101752730 B 10/2013
(Continued)

*Primary Examiner* — Abdullah A Riyami
*Assistant Examiner* — Justin M Kratt
(74) *Attorney, Agent, or Firm* — Ming Chieh Chang

(57) ABSTRACT

An electrical connector includes an insulative housing defining a mating slot, an inner metallic shield covering the insulative housing, and an outer metallic shield enclosing the insulative housing. The insulative housing includes a first wall, a second wall and two side walls. The inner metallic shield includes a main plate attached to the first wall and two side portions attached to the two side walls. The outer metallic shield includes a main plate located on the outer side of the main plate and two plates attached to the side portions respectively. The insulative housing is provided with grooves on the second walls. The plate is provided with a hook portion fixed in the groove. The two side portions engage the two plates.

15 Claims, 18 Drawing Sheets

(51) Int. Cl.

| | |
|---|---|
| *H01R 13/648* | (2006.01) |
| *H01R 12/72* | (2011.01) |
| *H01R 13/6594* | (2011.01) |
| *H01R 13/506* | (2006.01) |
| *H01R 24/60* | (2011.01) |

(52) U.S. Cl.

CPC .......... *H01R 13/506* (2013.01); *H01R 13/648* (2013.01); *H01R 13/658* (2013.01); *H01R 13/6594* (2013.01); *H01R 24/60* (2013.01)

(56) References Cited

U.S. PATENT DOCUMENTS

| | | | | |
|---|---|---|---|---|
| 2015/0024631 | A1* | 1/2015 | Lan | H01R 13/506 439/607.55 |
| 2020/0266584 | A1 | 8/2020 | Lu | |
| 2021/0218197 | A1 | 7/2021 | Lv et al. | |
| 2021/0218201 | A1 | 7/2021 | Lv et al. | |
| 2021/0367381 | A1 | 11/2021 | Lv et al. | |

FOREIGN PATENT DOCUMENTS

| | | | | |
|---|---|---|---|---|
| CN | 207504243 | U | | 6/2018 |
| CN | 208045830 | U | | 11/2018 |
| CN | 209374758 | U | | 9/2019 |
| CN | 210245775 | U | | 4/2020 |
| CN | 111162399 | A | * | 5/2020 |
| CN | 211829411 | U | | 10/2020 |
| CN | 212784067 | U | | 3/2021 |

* cited by examiner

ELECTRICAL CONNECTOR WITH STRUCTURE TO SECURE A SHIELD TO AN INSULATING BODY

BACKGROUND OF THE INVENTION

1. Field of the Invention

The present invention relates to an electrical connector, and particularly to the electrical connector with better stability of assembly.

2. Description of Related Arts

China Patent No. 209374758 discloses an electrical connector including an insulative housing extending in a longitudinal direction and a metal shell assembled an outside of the insulative housing. The metal shell includes two side plates at both ends in the longitudinal direction. Each side plate is provided with a first upper fixing portion and a first lower fixing portion which respectively abut against the upper and lower surfaces of the insulative housing. The insulative housing is fixed between the first upper fixing portion and the first lower fixing portion, thereby restricting the displacement of the metal shell in the vertical direction perpendicular to the longitudinal direction. However, the two side plates of the metal shell and the insulative housing are not provided with corresponding holding structures in the longitudinal direction, which cannot effectively prevent the side plates from being deformed in the longitudinal direction due to external force. China Patent No. 211829411 discloses an electrical connector including an insulative housing, an outer metallic shield surrounding the insulative housing and an inner metallic shield attached upon one side of the insulative housing. There is a lack of a mutual holding structure between the inner metallic shield and the outer metallic shield, and they may fall off due to the weak holding.

Therefore, it is desired to provide an electrical connector with better stability of assembly.

SUMMARY OF THE INVENTION

Therefore, the instant invention is to provide an electrical connector with better stability of assembly. To achieve the above-mentioned object, an electrical connector includes an insulative housing with a a first wall and a second wall extending in a longitudinal direction and spaced from each other in a parallel relation with a mating slot therebetween, an inner metallic shield covering the insulative housing, and an outer metallic shield. The mating slot is forwardly exposed to an exterior. The insulative housing includes a pair of side walls connecting the first wall and second wall. The inner metallic shield includes a main plate attached to the outer surface of the first wall and side portions bent from the main plate and attached to the outer surface of the side wall. The outer metallic shield includes a main plate located on the outer side of the main plate and a pair of second plates bent from the main plate. A pair of the second plates attached to the outer surface of the side portions respectively. The insulative housing is provided with grooves forwardly exposed to an exterior in the front-to-back direction at two opposite ends in the longitudinal direction of the second wall. Each of the second plates is provided with a first hook portion adjacent to the second wall. The first hook portion includes a bent portion bent inward and attached to the surface of the second wall, and a vertical portion bent from the bent portion to the direction of the first wall. The vertical portion is fixed in the groove. One of the side portion of the inner metallic shield and the second plate of the outer metallic shield is provided with a protrusion, and the other is provided with a recess for receiving and holding the protrusion.

Other advantages and novel features of the invention will become more apparent from the following detailed description of the present embodiment when taken in conjunction with the accompanying drawings.

DETAILED DESCRIPTION OF THE PREFERRED EMBODIMENT

Reference will now be made in detail to the preferred embodiments of the present invention. Referring to FIGS. 1-13 illustrating an electrical connector 100 of a first embodiment of this invention, the electrical connector 100 is of a right angle type, that is, a mating direction of the electrical connector 100 is a front-to-back direction.

Figure 1:
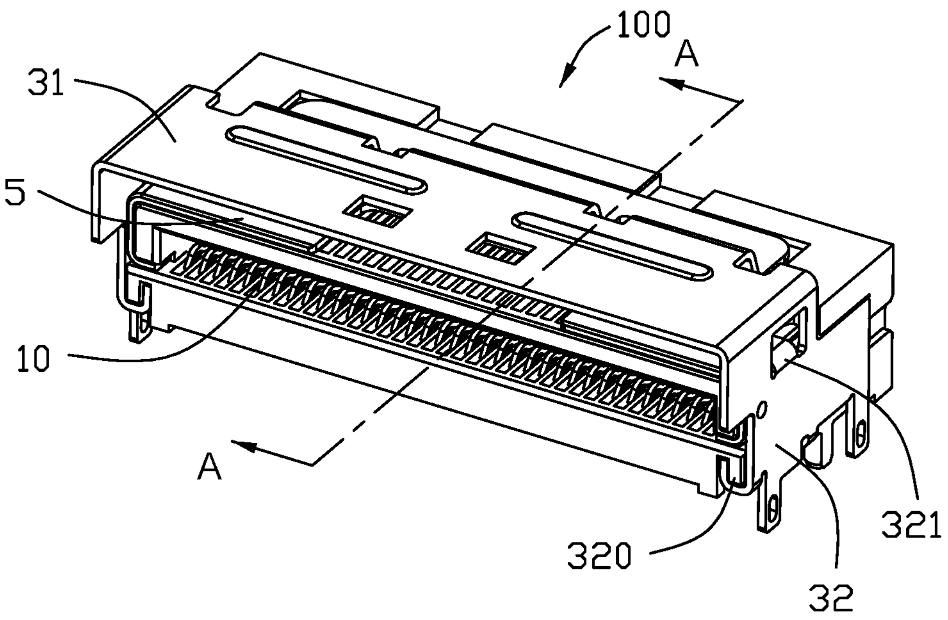
FIG. 1 is a perspective view of an electrical connector of a first embodiment.
Figure 2:
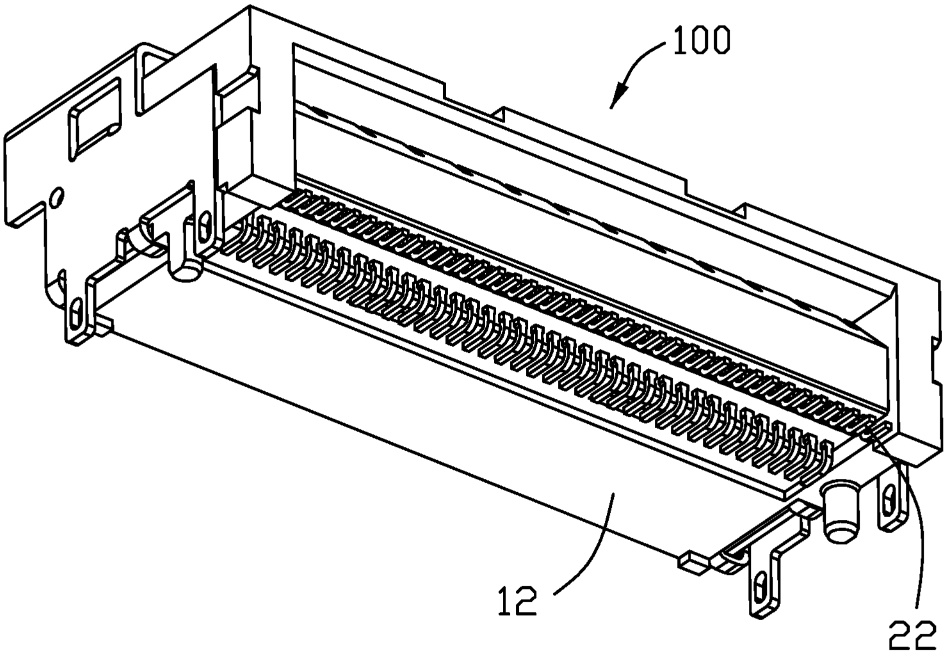
FIG. 2 is another perspective view of the electrical connector of FIG. 1.
Figure 3:
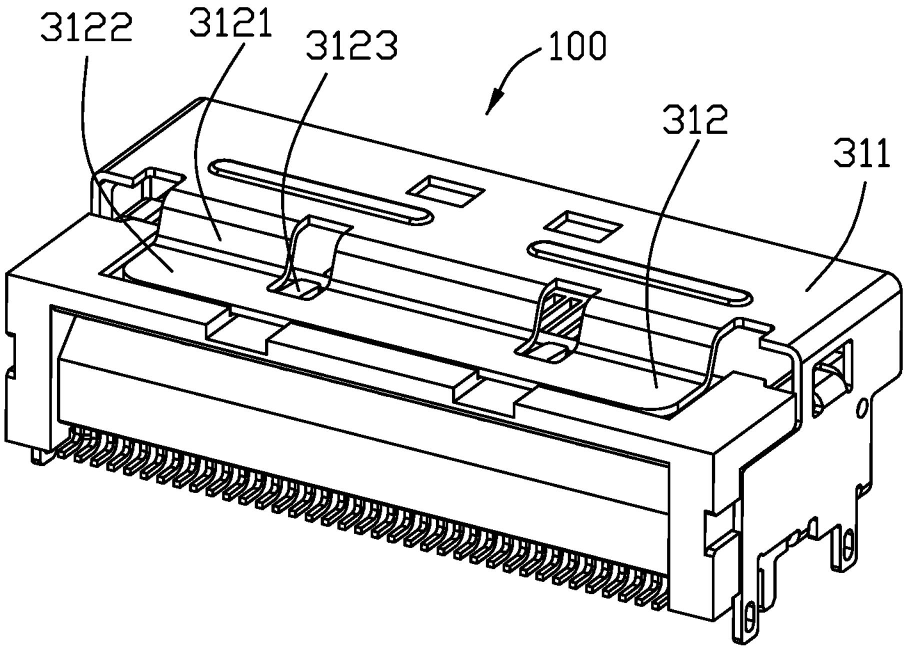
FIG. 3 is another perspective view of the electrical connector of FIG. 1.

As shown in FIGS. 5-10, the electrical connector 100 includes an insulative housing 1 with a first wall 11 and a second wall 12 extending in a longitudinal direction and spacing from each other in an upright direction with a mating slot 10 therebetween, a plurality of contacts 2 arranged on the insulative housing 1, an inner metallic shield 4 covering the insulative housing 1, and an outer metallic shield 3. The mating slot 10 is exposed to an exterior through a front face. The insulative housing 1 includes a pair of side walls 13 connecting with the first wall 11 and second wall 12. Each of the contacts 2 includes a contacting section 21 extending into the mating slot 10 and a soldering section 22 extending out of the second wall 12. The inner metallic shield 4 includes a main portion 40 attached to the outer surface of the first wall 11 and two side portions 41 bent from the main portion 40 and attached to the outer surfaces of the side walls 13. The two side portions 41 clamp the insulative housing 1. The outer metallic shield 3 includes a main plate 31 located beside the outer side of the first wall 11 and a pair of side plates 32 bent from the main plate 31. A pair of the side plates 32 are attached to the outer surface of a pair of the side walls 13 respectively. The side portions 41 of the inner metallic shield 4 is sandwiched between the side walls 13 and the side plate 314 of the outer metallic shield 3. The main plate 11 is separated from the main plate 40 by a distance. A longitudinal slot 5 as labeled in FIG. 1 is provided between the main plate 31 and the inner metallic shield 4 for mating with a protruding portion (not shown) of a mating plug. Therefore, the longitudinal slot 5 formed by the inner metallic shield 4 and the main plate 31 has strong strength of structural.

Figure 4:
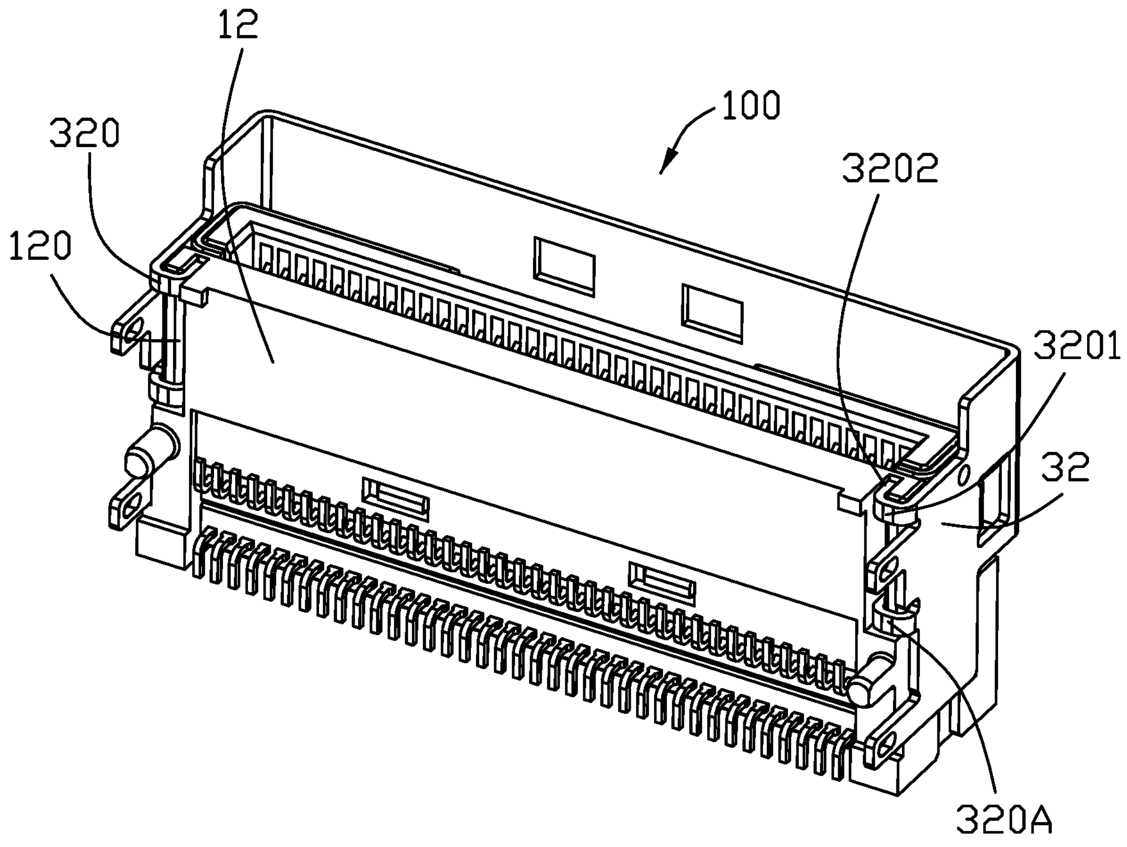
FIG. 4 is another perspective view of the electrical connector of FIG. 1.
Figure 9:
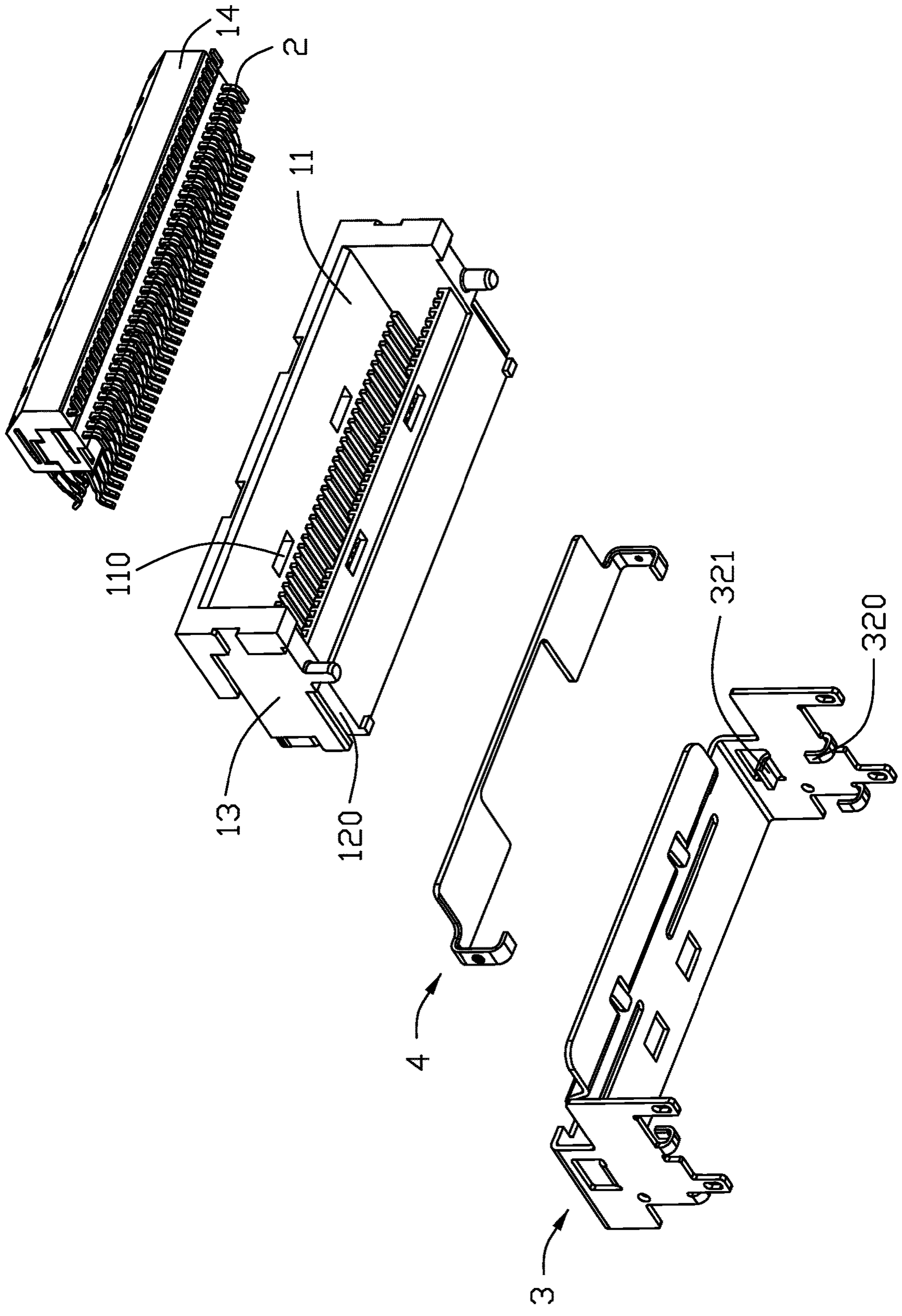
FIG. 9 is another exploded perspective view of the electrical connector of FIG. 7.

Referring to FIGS. 4 and 9, the insulative housing 1 is provided with a groove 120 at each end of the second wall in the longitudinal direction, and extending forward. Each of the side plates 32 is provided with a first hook portion 320 adjacent to the second wall 12. The first hook portion 320 includes a bent portion 3201 bent inward and attached to the bottom surface of the second wall 12, and a vertical portion 3202 bent from the bent portion 3201 toward the first wall 11, i.e., the upright direction. The vertical portion 3202 is fixed in the groove 120. The groove 120 is used to fix the vertical portion 3202. The engaging structure of the first hook portions 320 and the grooves 120 are beneficial to avoid displacement of the side plate 32 in the longitudinal direction due to external force. This is beneficial to improve the dimensional accuracy of the electrical connector 100.

Figure 5:
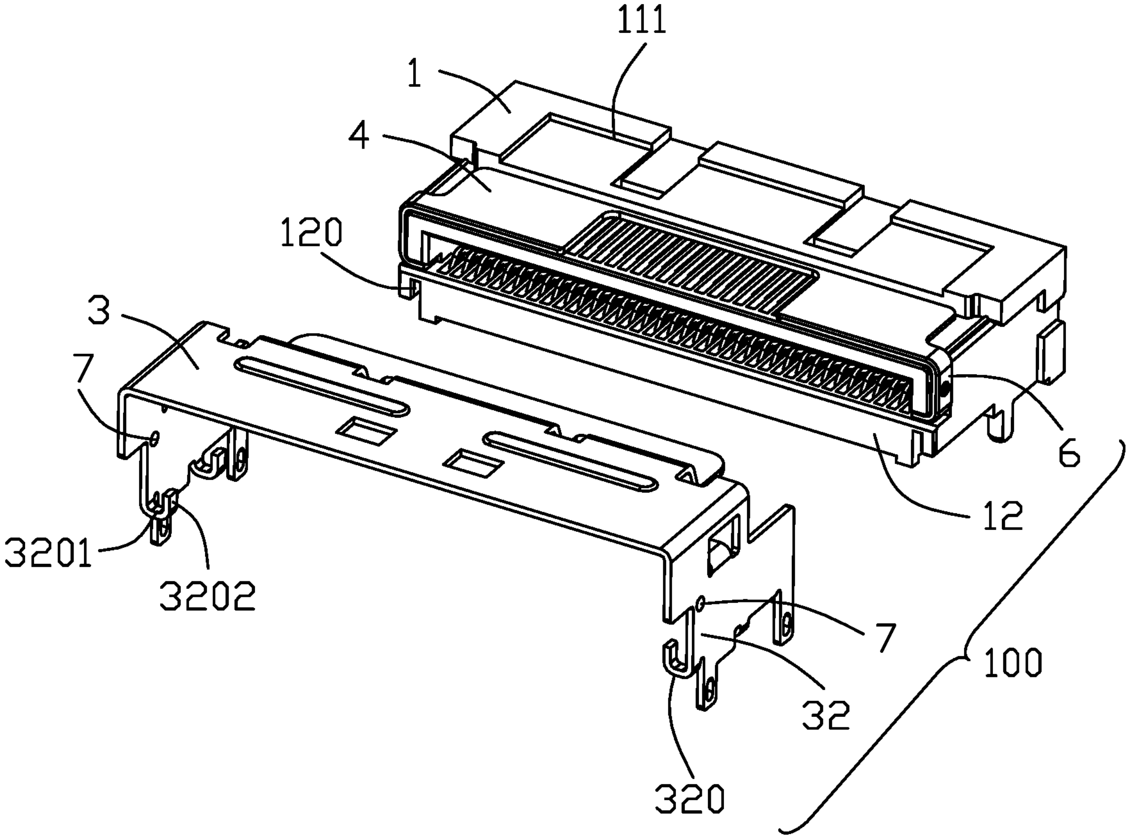
FIG. 5 is an exploded perspective view of the electrical connector of FIG. 1.
Figure 6:
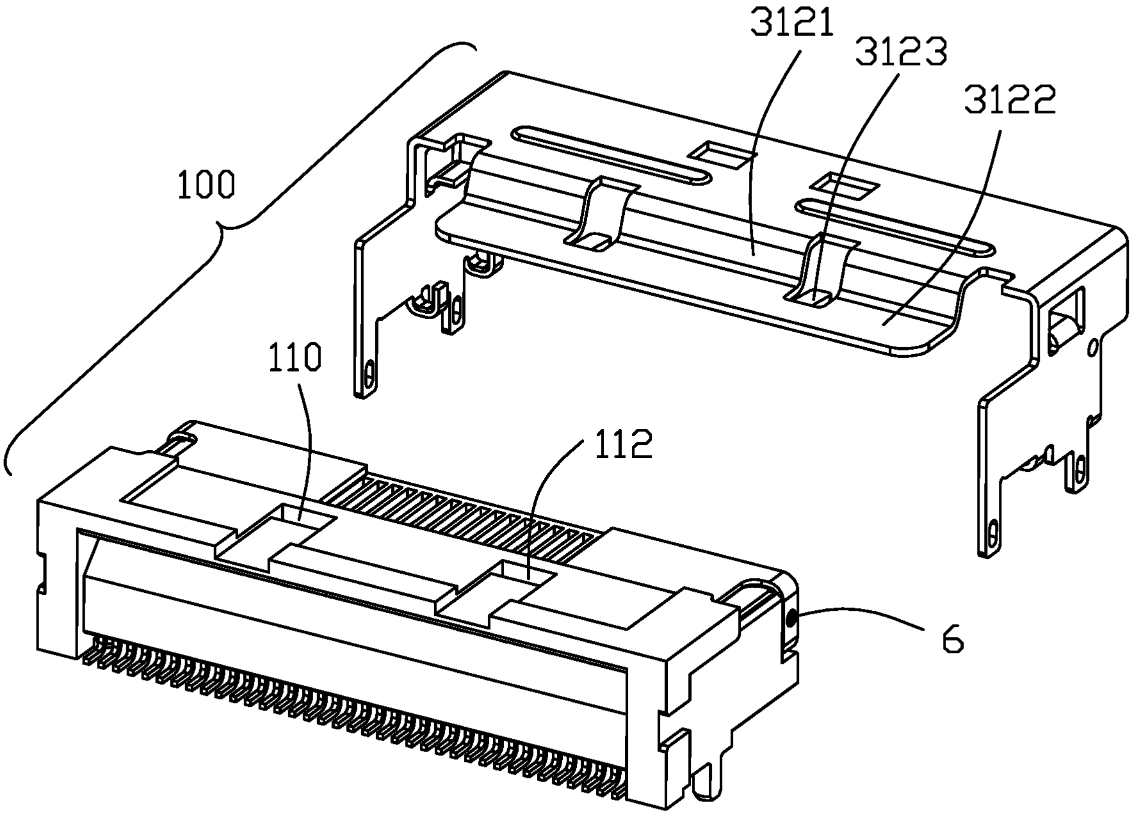
FIG. 6 is another exploded perspective view of the electrical connector of FIG. 5.

As shown in FIG. 5, the outer surface of the second wall 12 between the groove 120 and two opposite ends in the longitudinal direction of the second wall 12 is cut off partially to accommodate the bent portion 3201. The outer metallic shield 3 is assembled to the insulative body 1 from front to back. The vertical portion 3202 is assembled to the groove 120 from a front end of the groove 120. As shown in FIG. 4, in this embodiment, each of the side plates 32 is provided with two second hook portions 320A arranged in the front-to-back direction at each end, and the second hook portions 320A abut against the insulative housing 1 for preventing the side plates 32 backwards. The groove 120 does not penetrate the rear end of the second wall 12. The second hook portions 320A abut against the rear end of the groove 120 backwards, which can restrict the displacement of the outer metallic shield 3 toward the rear.

There is a restriction structure between the main plate 31 and the first wall 11 for restricting the moving of the outer metallic shield 3 in the front-to-back direction. Referring to FIGS. 3-10, the main plate 31 includes a partitioning plate 311 arranged at the front end thereof and an abutting plate 312 arranged at the rear end thereof. The partitioning plate 311 is separated from the first wall 11 by a distance. The abutting plate 312 includes an inclined portion 3121 bent and extended from the partitioning plate 311 to the first wall 11 and a limiting portion 3122 extending horizontally rearward from the inclined portion 3121. The limiting portion 3122 is attached to the surface of the first wall 11. The first wall 11 is recessed from its surface to form a first stepped surface 111 facing forward and a second stepped surface 112 facing rear. The limiting portion 3122 is accommodated in the recess and abuts against the first stepped surface 111 backward. The limiting portion 3122 is provided with protruding tabs 3123 extending forward. The protruding tabs 3123 abut against the second stepped surface 112 forward. This is beneficial to limit the displacement of the outer metallic shield 3 in the front-to-back direction and ensure that it is firmly assembled on the insulative housing 1.

Figure 10:
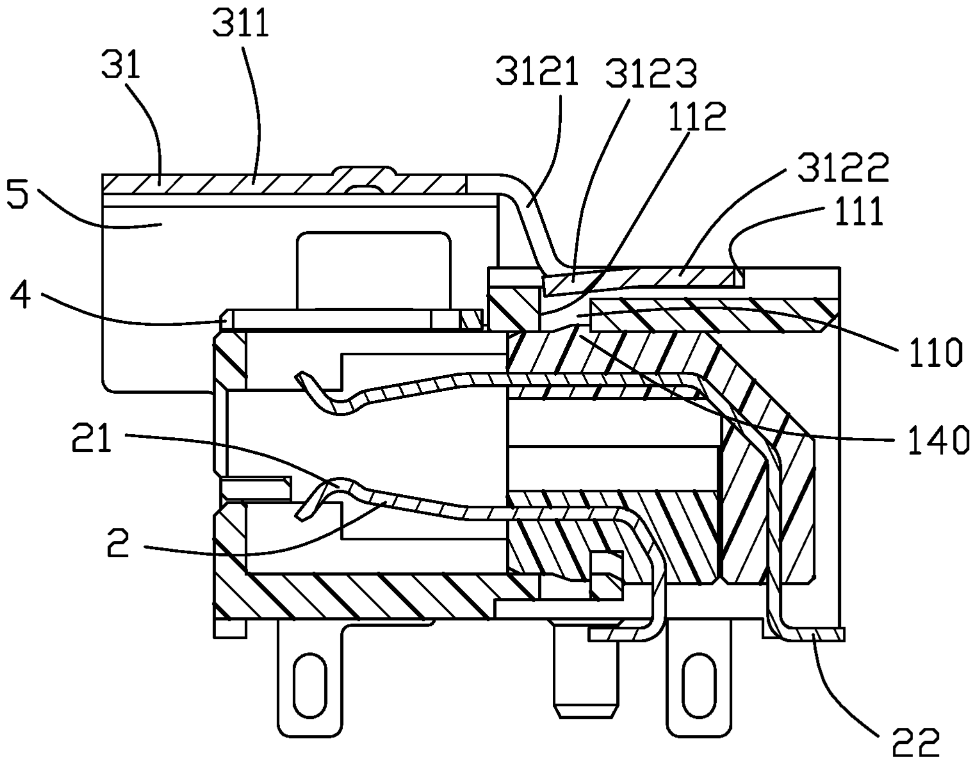
FIG. 10 is a cross-sectional view of the electrical connector of FIG. 1 taken along lines A-A.

As shown in FIGS. 9-13, the first wall 11 is provided with a hole 110 penetrating through the first wall 11 in the thickness or upright direction of the first wall 11. The contacts 2 are fixed to an insulative block 14. The insulative block 14 is provided with a holding protrusion 140 protruding into the hole 110. The holding protrusion 140 abuts against the inner surface of the hole 110 backward. The front end of the insulative block 14 abuts against the first wall 11 and the second wall 12. Referring to FIG. 10, the second stepped surface 112 is formed on the inner surface of the hole 110. The protruding tabs 3123 are received in the slot 110 at the same time. The front end of the protruding tabs 3123 extends obliquely toward the recessed direction of the slot 110, so that the protruding tab 3123 firmly abuts the second stepped surface 112.

Figure 11:
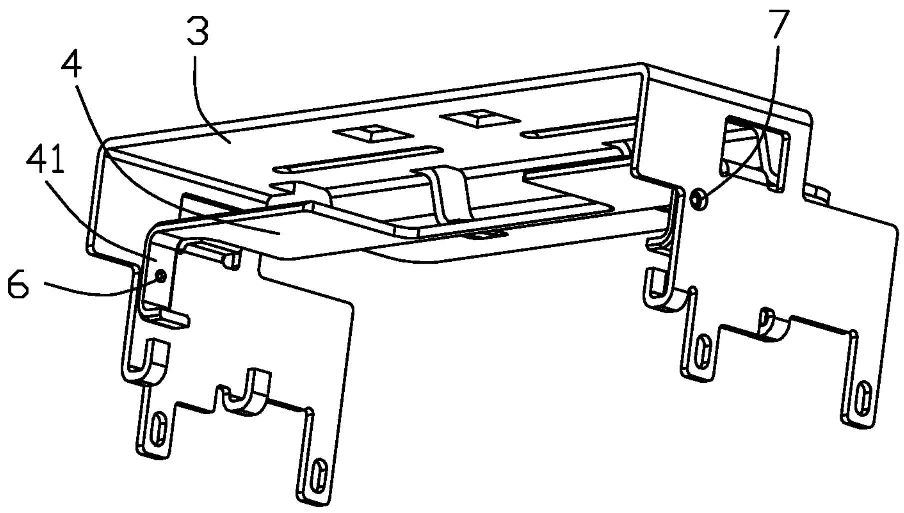
FIG. 11 is a perspective view of the inner metallic shield and the outer metallic shield of the electrical connector of FIG. 1.
Figure 12:
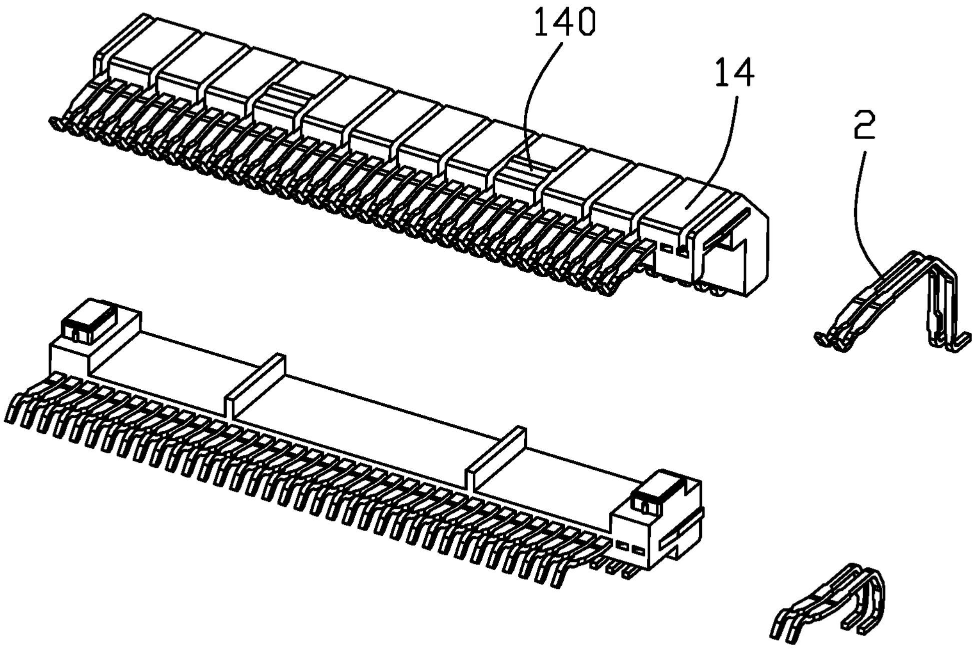
FIG. 12 is a part of the exploded perspective view of the electrical connector of FIG. 8.
Figure 13:
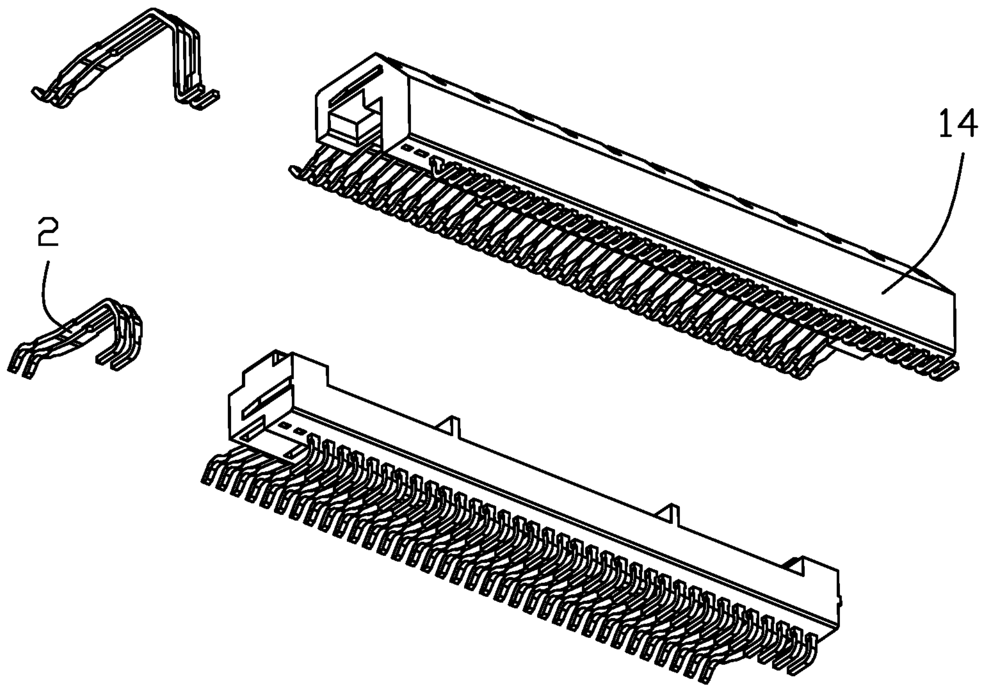
FIG. 13 is another exploded perspective view of the electrical connector of FIG. 8.
Figure 14:
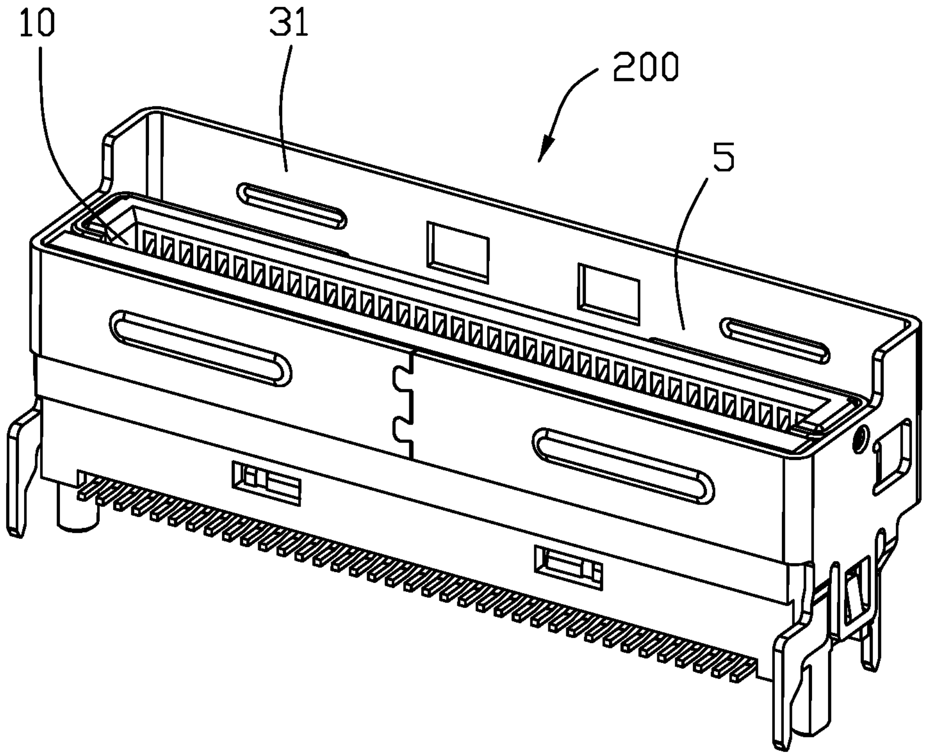
FIG. 14 is a perspective view of an electrical connector of a second embodiment.

Referring to FIG. 11, one of the side portion 41 of the inner metallic shield 4 and the side plate 32 of the outer metallic shield 3 is provided with a protrusion 6, and the other is provided with a recess 7 for receiving and holding the protrusion 6. The protrusion 6 and the recess 7 are buckled together, so as to increase the interference force between the inner metallic shield 4 and the outer metallic shield 3. The protrusion 6 and the recess 7 are arranged near the front end of the mating slot 10.

Figure 7:
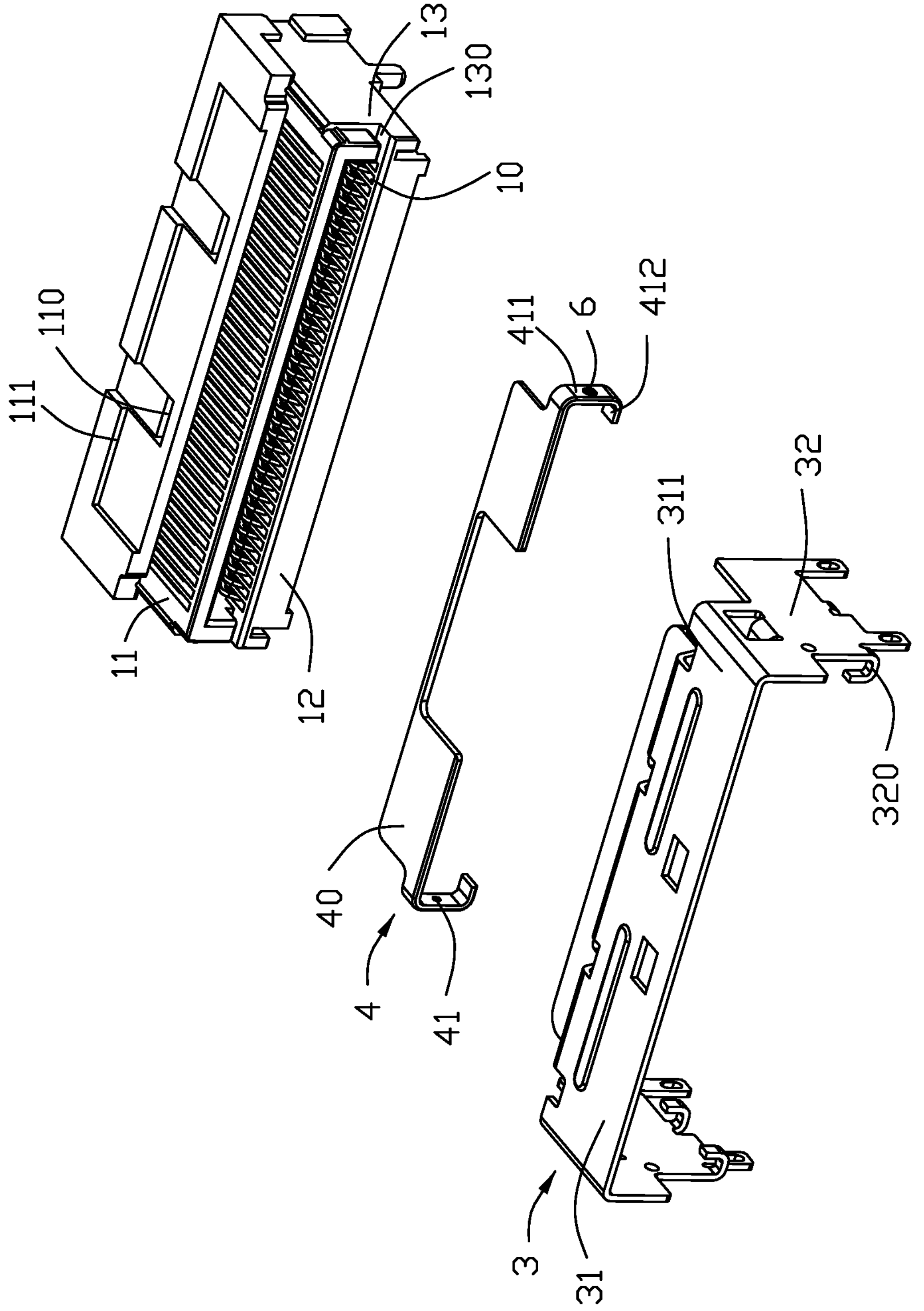
FIG. 7 is a further exploded perspective view of the electrical connector of FIG. 5.
Figure 8:
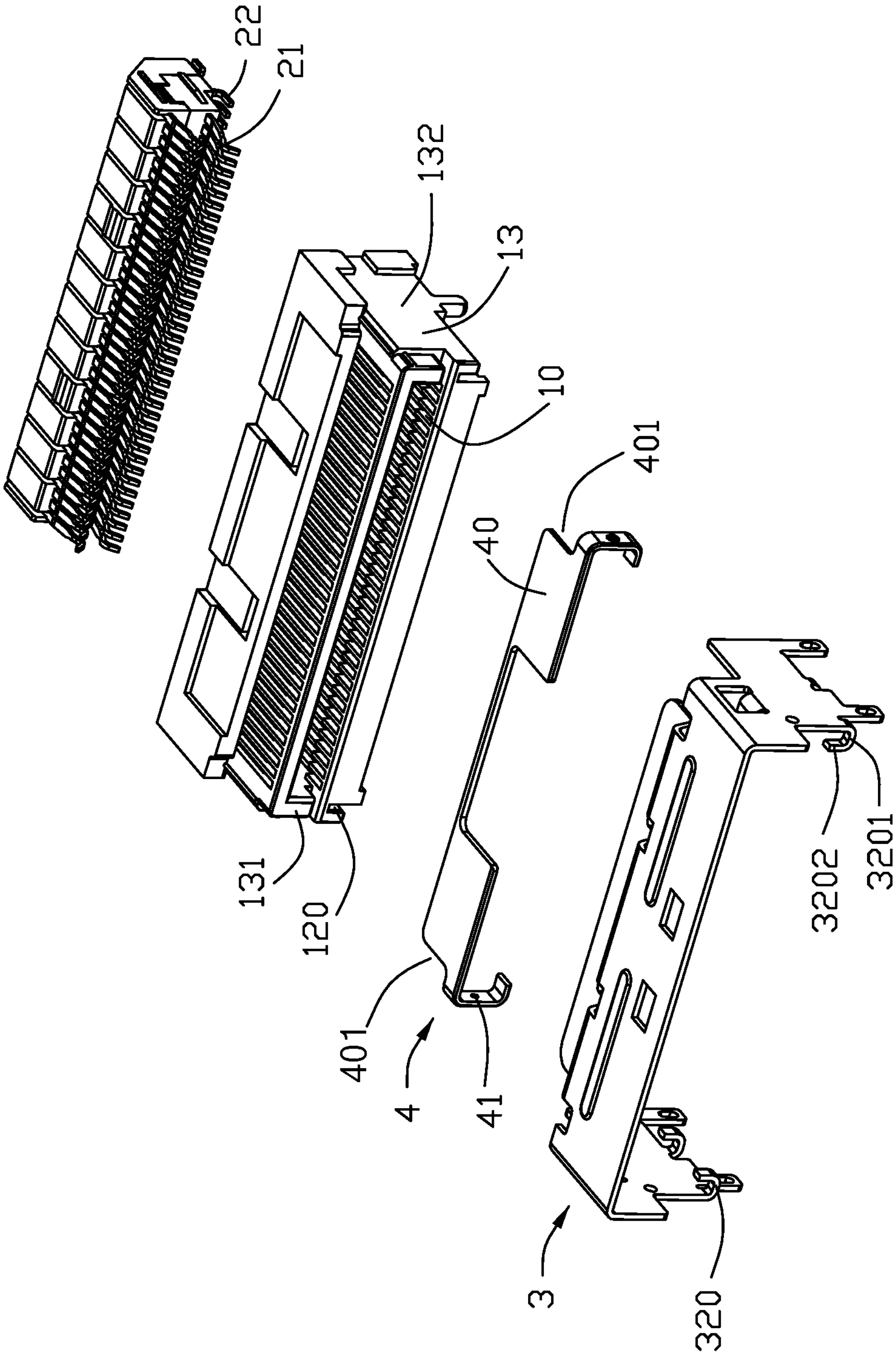
FIG. 8 is a further exploded perspective view of the electrical connector of FIG. 7.

As shown in FIGS. 7-9, the side portions 41 extend from the two longitudinal opposite ends of the main portion 40 towards the second wall 12. The protrusion 6 is provided on the side portion 41. The side plate 32 is provided with the recess 7 corresponding to the protrusion 6. The recess 7 penetrates through the side plate 32 along the longitudinal direction. The side portion 41 includes an arm 411 extending from the two opposite longitudinal ends of the main portion 40 towards the second wall 12 and a clamping end 412 bent from the arm 411 towards the mating slot 10. The arms 411 are arranged close to the side wall 13. The clamping ends 412 are inserted into the side wall 13. The protrusion 6 is arranged on the arm 411. The side wall 13 is provided with a cutout 130 penetrating the front surface 131 and the outer surface 132 of the side wall 13, the clamping ends 412 are arranged in the cutouts 130. The cutout 130 penetrates the side wall 13 along the longitudinal direction and communicates with the mating slot 10.

As shown in FIGS. 1-7, the main portion 40 is provided with notches 401 retracted in the longitudinal direction. The side plate 32 of the outer metallic shield 3 is provided with resistant tab 321 bent inward, the resistant tab 321 presses against the first wall 11 at a position of the notch 401. The resistant tab 321 is pressed against the two opposite ends in the longitudinal direction of the first wall 11. The resistant tab 321 abut forward against the side portion 41 to further limit the forward displacement of the outer metallic shield 3.

Figure 15:
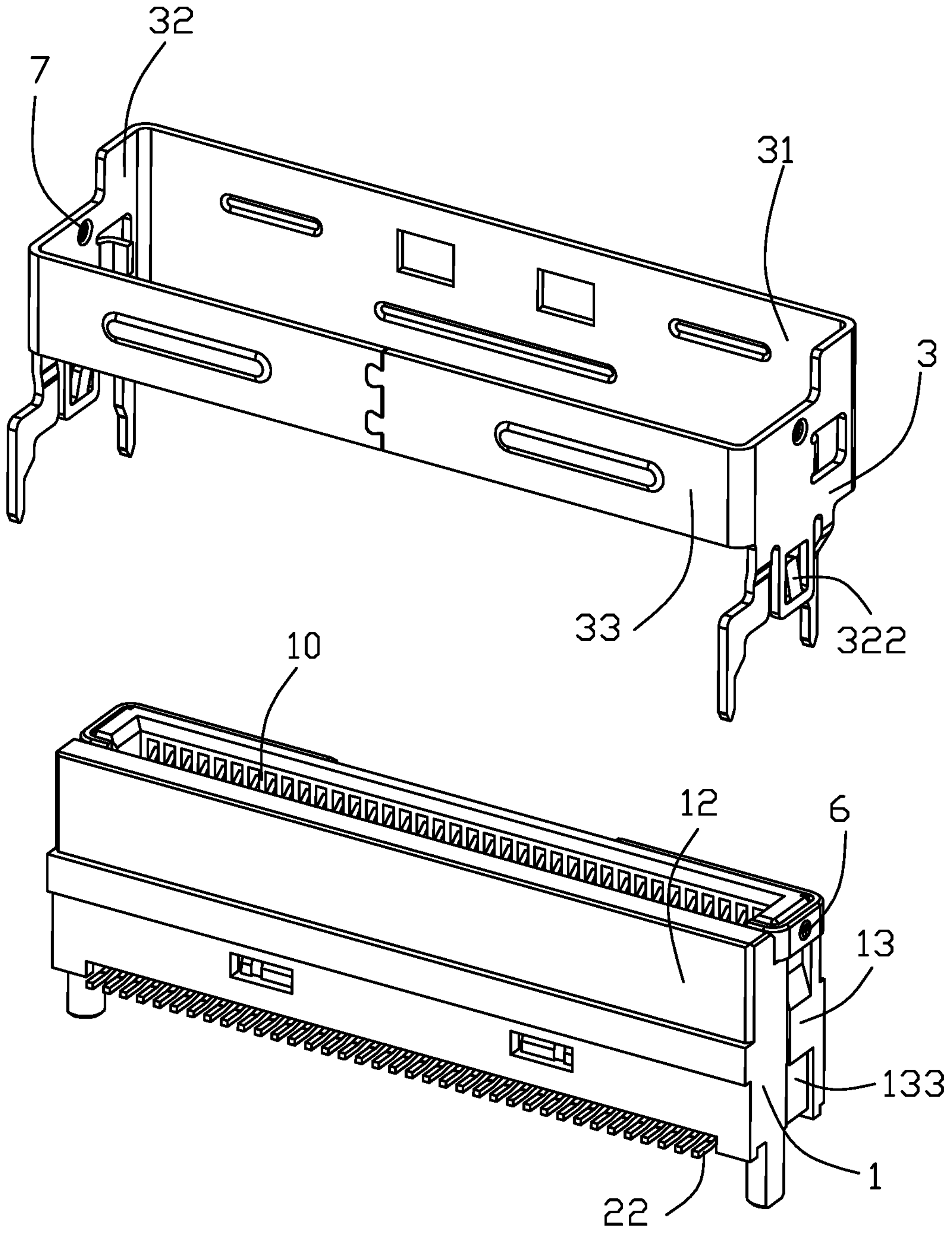
FIG. 15 is an exploded perspective view of the electrical connector of FIG. 14.
Figure 16:
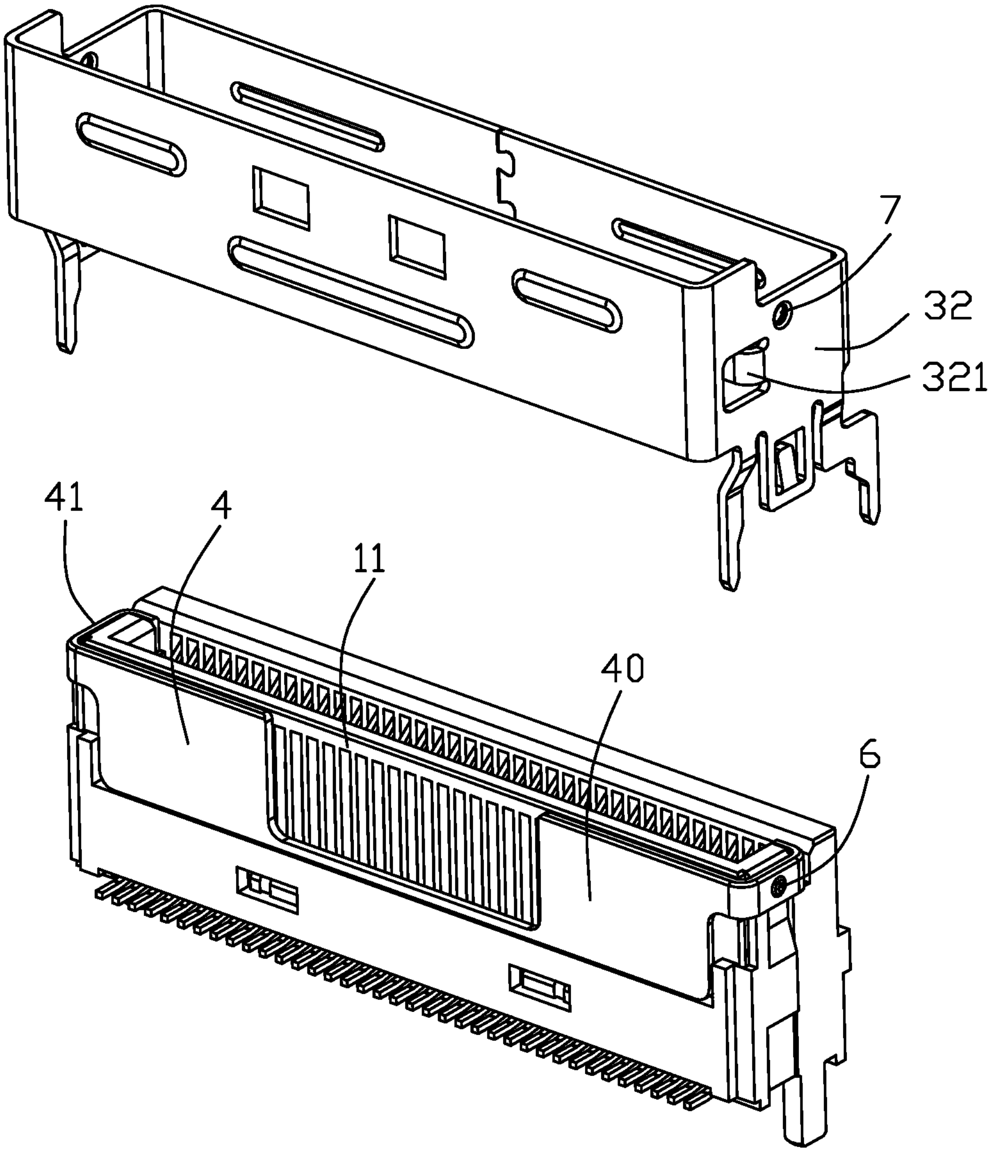
FIG. 16 is another exploded perspective view of the electrical connector of FIG. 14.
Figure 17:
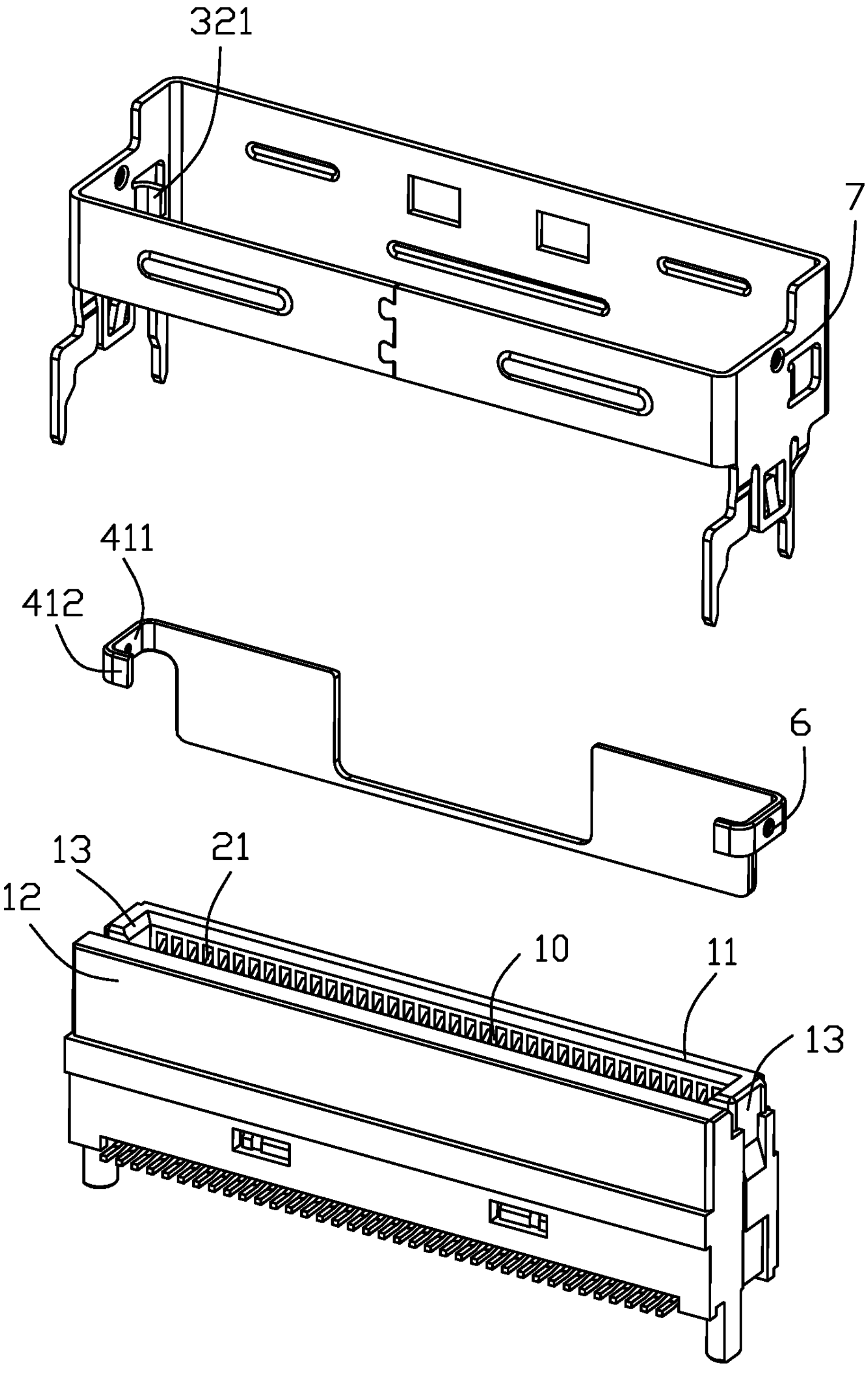
FIG. 17 is a further exploded perspective view of the electrical connector of FIG. 15.
Figure 18:
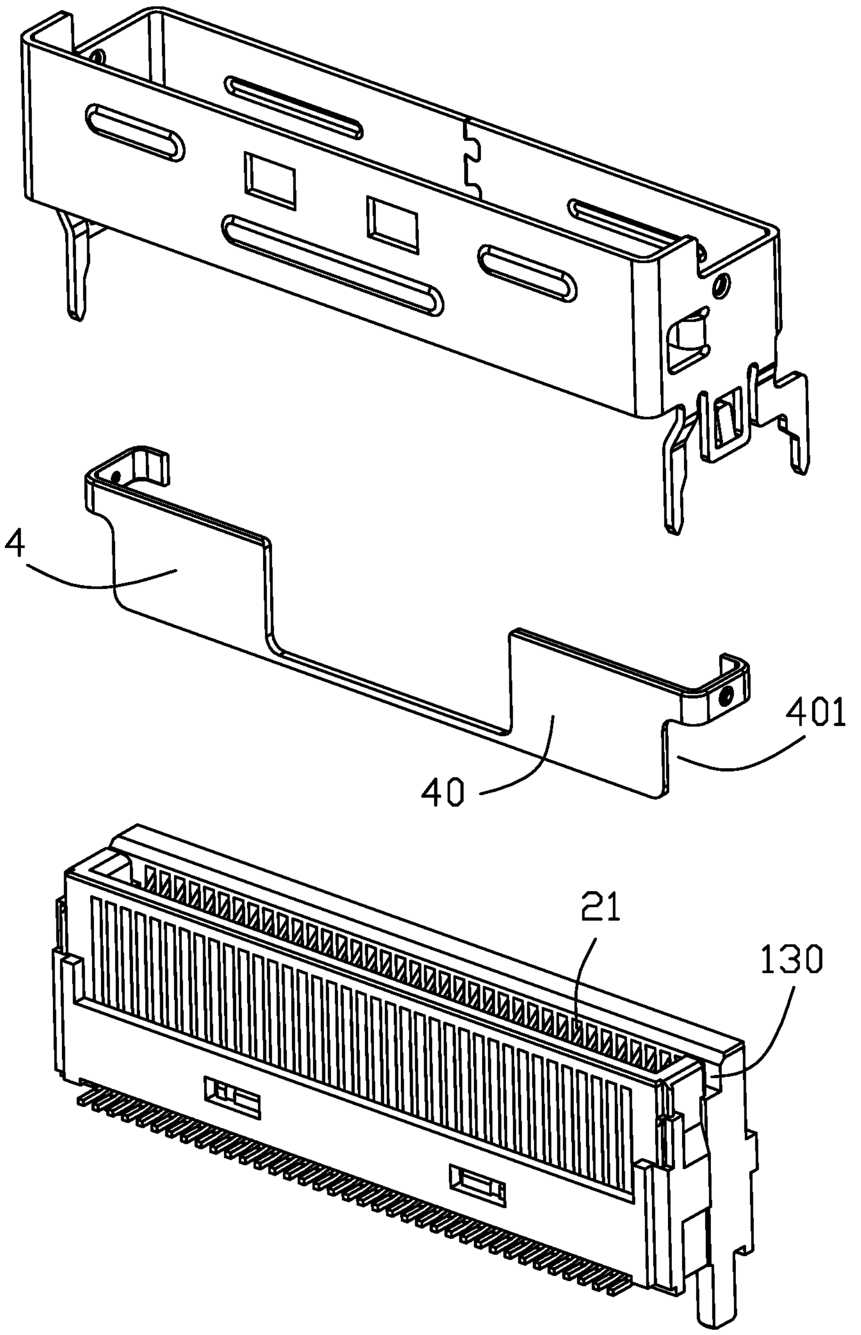
FIG. 18 is a further exploded perspective view of the electrical connector of FIG. 16.

Referring to FIGS. 14-18 illustrating an electrical connector 200 of the second preferred embodiment of the invention, which has a similar interface to the electrical connector 100 while is of an upright type of connector, i.e., with a upright mating direction. Main features are descript hereinafter, and the same elements are labeled with same numerals corresponding to the first embodiment. The outer metallic shield 3 of the electrical connector 200 further includes a longitudinal plate 33 parallel to the main plate 40 and fittingly attached to the outer surface of the second wall 12. The outer metallic shield 3 is surrounded around the insulative housing 1. The contacts 2 includes a contacting section 21 extending into the mating slot 10 and a soldering section 22 extending out of the insulative housing 1. As shown in FIG. 15, the side wall 13 of the insulative housing 1 is provided with a trough 133. The side plate 32 is provided with an elastic tab 322 abutting against the trough 133 in order to fix the outer metallic shield 3 to the insulative housing 1. Similarly, one of the side portion 41 of the inner metallic shield 4 and the second plate 32 of the outer metallic shield 3 is provided with protrusions 6, and the other is provided with recesses 7 for receiving and holding the protrusion 6. In other embodiments, the protrusion 6 can also be provided on the side plate 32 of the metallic shield 3, and the recess 7 can be provided on the side portion 41 of the inner metallic shield 4 at the position corresponding to the protrusion 6.

Compared with the conventional receptacle disclosed in the aforementioned China Patent CN209374758U, the invention includes the grooves and the first hook portions fixed in the grooves for improving the dimensional accuracy of the electrical connector 100. Compared with the conventional receptacle disclosed in the aforementioned China Patent CN211829411U, the invention includes the protrusion 6 and the recess 7 for receiving and holding the protrusion 6, which can increase the interference force between the inner metallic shield 4 and the outer metallic shield 3.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. An electrical connector comprising:

an insulative housing comprising a first wall and a second wall spaced from and parallel with each other and two side walls connecting with opposite ends of the first wall and the second wall and defining a mating slot between the first wall and the second wall and opening forwards;

a plurality of contacts arranged on the insulative housing and comprising contacting sections extending into the mating slot; and an outer metallic shield enclosing the insulative housing and comprising a main plate located on an outer side of the first wall while separated from the first wall by a distance and a pair of side plates fittingly attached to outer sides of the side walls, respectively;

wherein the insulative housing has a groove extending forwardly at each end of the second wall proximal to a corresponding side wall, and each of the side plates comprises a first hook portion bending inward and fittingly retained in the corresponding groove on the second wall;

wherein the first hook portion comprises a bent portion bending inward from a bottom edge of the side plate and a vertical portion bending from the bent portion towards the first wall, the bent portion straddles the second wall, and the vertical portion is fixed in the groove;

wherein a part of the second wall between the groove and the outer side of a corresponding side wall is cut off partially to accommodate the bent portion; and wherein each of the side plates comprises a second hook portion behind the first hook portion, and the second hook portions are fittingly retained in the groove and backwardly abut against the insulative housing.

2. The electrical connector as claimed in claim 1, wherein the main plate comprises a partitioning plate and an abutting plate behind the partitioning plate, the partitioning plate is separated from the first wall, the abutting plate comprises an inclined portion extending rearwards from the partitioning plate and a limiting portion extending rearward from the inclined portion, and the limiting portion is attached to an outer side of the first wall and limits a movement of the main plate in a front and rear direction.

3. The electrical connector as claimed in claim 2, wherein the first wall is recessed from the outer side thereof to form a first stepped surface facing forwards and a second stepped surface facing rearwards, the limiting portion is accommodated in the recess and abuts against the first stepped surface backward, and the limiting portion defines protruding tabs extending forward and forwardly abutting against the second stepped surface.

4. The electrical connector as claimed in claim 3, wherein the first wall defines a hole penetrating through the first wall in a thickness direction of the first wall, the contacts are fixed to an insulative block, the insulative block defines a holding protrusion protruding into the hole, and the holding protrusion backwardly abuts against an inner surface of the hole.

5. The electrical connector as claimed in claim 4, wherein the second stepped surface is formed on the inner surface of the hole.

6. The electrical connector as claimed in claim 1, further comprising an inner metallic shield, and wherein the inner metallic shield comprises a main portion fittingly attached to the outer side of the first wall and side portions at two opposite ends of the main portion, the outer metallic shield comprises a resistant tab bending inwards from the side plate and pressing forward against a notch defined on the main portion of the inner metallic shield.

7. An electrical connector comprising:

an insulative housing comprising a first wall and a second wall extending in a longitudinal direction and two side walls connecting opposite longitudinal ends of the first wall and second wall and defining a longitudinal mating slot opening forward between the first wall and second wall;

a plurality of contacts arranged on the insulative housing;

an inner metallic shield comprising a main portion fittingly attached to an outer surface of the first wall and two side portions bending from the main portion and attached to an outer surface of the side walls;

an outer metallic shield comprising a main plate located on an outer side of the first wall and defining a gap between the main portion of the inner metallic shield and the main plate, two side plates bending from the main plate and attached to the outer surface of the side wall respectively, the side portions of the inner metallic shield sandwiched between the side walls and the side plate of the outer metallic shield;

wherein one of the side portion of the inner metallic shield and the side plate of the outer metallic shield is provided with a protrusion, and the other is provided with a recess to receive and hold the protrusion.

8. The electrical connector as claimed in claim 7, wherein the side portion comprises an arm extending from two opposite longitudinal ends of the main portion and a clamping end bending from the arm towards the mating slot, and the clamping end is fittingly retained in a cutout defined on the side wall.

9. The electrical connector as claimed in claim 8, wherein the cutout penetrates the side wall and communicates with the mating slot along the longitudinal direction.

10. The electrical connector as claimed in claim 7, wherein the outer metallic shield comprises a longitudinal plate attached to the outer surface of the second wall.

11. An electrical connector comprising:

an insulative housing comprising a first wall and a second wall spaced from and parallel with each other and two side walls connecting with opposite ends of the first wall and the second wall and defining a mating slot between the first wall and the second wall and opening forwards;

a plurality of contacts arranged on the insulative housing and comprising contacting sections extending into the mating slot; and an outer metallic shield enclosing the insulative housing and comprising a main plate located on an outer side of the first wall while separated from the first wall by a distance and a pair of side plates fittingly attached to outer sides of the side walls, respectively;

wherein the insulative housing has a groove extending forwardly at each end of the second wall proximal to a corresponding side wall, and each of the side plates comprises a first hook portion bending inward and fittingly retained in the corresponding groove on the second wall;

wherein the main plate comprises a partitioning plate and an abutting plate behind the partitioning plate, the partitioning plate is separated from the first wall, the abutting plate comprises an inclined portion extending rearwards from the partitioning plate and a limiting portion extending rearward from the inclined portion, and the limiting portion is attached to an outer side of the first wall to limit a movement of the main plate in a front and rear direction; and wherein the first wall is recessed from the outer side thereof to form a first stepped surface facing forwards and a second stepped surface facing rearwards, the limiting portion is accommodated in the recess and abuts against the first stepped surface backward, and the limiting portion defines protruding tabs extending forward and forwardly to abut against the second stepped surface.

12. The electrical connector as claimed in claim 11, wherein the first hook portion comprises a bent portion bending inward from a bottom edge of the side plate and a vertical portion bending from the bent portion towards the first wall, the bent portion straddles the second wall, and the vertical portion is fixed in the groove.

13. The electrical connector as claimed in claim 12, wherein a part of the second wall between the groove and the outer side of a corresponding side wall is cut off partially to accommodate the bent portion.

14. The electrical connector as claimed in claim 11, wherein the first wall defines a hole penetrating through the first wall in a thickness direction of the first wall, the contacts are fixed to an insulative block, the insulative block defines a holding protrusion protruding into the hole, and the holding protrusion backwardly abuts against an inner surface of the hole.

15. The electrical connector as claimed in claim 11, further comprising an inner metallic shield, and wherein the inner metallic shield comprises a main portion fittingly attached to the outer side of the first wall and side portions at two opposite ends of the main portion, the outer metallic shield comprises a resistant tab bending inwards from the side plate and pressing forward against a notch defined on the main portion of the inner metallic shield.

* * * * *